United States Patent [19]

Langdon

[11] 4,261,704

[45] Apr. 14, 1981

[54] POLYOXYALKYLENE POLYAMINE DETERGENT COMPOSITIONS

[75] Inventor: William K. Langdon, Grosse Ile, Mich.

[73] Assignee: BASF Wyandotte Corporation, Wyandotte, Mich.

[21] Appl. No.: 51,328

[22] Filed: Jun. 22, 1979

Related U.S. Application Data

[63] Continuation-in-part of Ser. No. 866,205, Jan. 3, 1978, abandoned.

[51] Int. Cl.$^3$ ................................................ C10L 1/22
[52] U.S. Cl. ........................................... 44/62; 44/72; 44/75; 525/407; 564/348; 564/505
[58] Field of Search ....................... 260/570.7, 584 B; 525/407; 44/62, 73, 72, 75

[56] References Cited

U.S. PATENT DOCUMENTS

| | | | |
|---|---|---|---|
| 3,251,852 | 5/1966 | DeGroote et al. | 260/2 |
| 3,331,788 | 7/1967 | Lorensen et al. | 260/2 |
| 3,347,803 | 10/1967 | Frotscher et al. | 260/2 |
| 3,515,698 | 6/1970 | Mauz et al. | 260/75 |
| 3,691,110 | 9/1972 | Ohfuka et al. | 260/2 EP |
| 3,746,678 | 7/1973 | Dick et al. | 260/2 A |
| 3,753,931 | 8/1973 | Raspanti | 260/2 BP |
| 4,056,510 | 11/1977 | Symm et al. | 260/47 EP |

Primary Examiner—Earl A. Nielsen
Attorney, Agent, or Firm—Joseph D. Michaels; Arnold S. Weintraub

[57] ABSTRACT

Polyoxyalkylene polyamines are prepared by first reacting a polyoxyalkylene polyol or a polyoxyalkylene glycol monoether with a halogen-containing compound. The resulting halogenated ether is then aminated by the reaction therewith of a mono- or polyamine. The resulting products are substantially monoamine or polyamine derivatives depending upon the amine reactants. The resulting amines hereof are useful as intermediates for preparing cationic surfactants, cationic polymers and as fuel detergent additives.

15 Claims, No Drawings

POLYOXYALKYLENE POLYAMINE DETERGENT COMPOSITIONS

CROSS-REFERENCE TO RELATED APPLICATION

This application is a continuation-in-part application of copending U.S. patent application Ser. No. 866,205, filed Jan. 3, 1978, and now abandoned "Polyalkylene Polyamine Ether Derivatives of Polyoxyalkylene Compounds", the disclosure of which is hereby incorporated by reference.

BACKGROUND OF THE INVENTION

1. Field of the Invention

The present invention pertains to amine compounds. More particularly, the present invention pertains to amine-based ether compounds and methods of preparation therefor. Even more particularly, the present invention concerns amines derived from the reaction of either polyoxyalkylene polyols or polyoxyalkylene glycol monoethers with a suitable amine, as well as methods of preparation thereof.

2. Background of the Invention

In the above-referred to copending application, there is disclosed a class of polyamines which generally correspond to the formula:

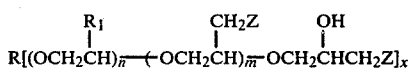

wherein:
R is the residue, after removal of one or more hydroxyl groups, of a hydroxyl-containing compound having from one to eight hydroxyl groups;
$R_1$ is either H, $CH_3$ or $C_2H_5$;
Z is the residue, after removal of one or more amino hydrogens, of an amine selected from the group consisting of $NR''_3$ in which $R''$ is hydrogen or a $C_1$ to $C_8$ alkyl group, alkylene diamine or polyalkylene polyamine;
n is a number ranging from about 1 to about 100;
m is a number ranging from about 1 to about 30;
x is an integer ranging from 1 to 8, and when z is $-NR''_3$, at least one $R''$ is a 1 to 8 carbon alkyl group.

The polyamines of the copending application are generally prepared from the reaction of a hydroxyl-containing compound having from one to eight hydroxyl groups and a halohydrin. The resulting halogen-containing ether is then reacted with an amine. The amine replaces the available halogen atom.

The present invention, as will subsequently be detailed, defines a specific class of amines which fall within the spectrum of the amines of the copending application.

STATEMENT OF THE RELEVANT ART

To the best of applicant's knowledge, the most closely related art is found in:

| U.S. Pat. Nos. | 3,607,792 | 3,331,788 |
|---|---|---|
| | 2,537,726 | 3,251,852 |
| | 2,601,597 | 3,753,931 |
| | 2,898,349 | 3,347,803 |
| | 2,174,762 | 4,056,510 |
| | 3,746,678 | 3,515,698 |
| | 3,691,110 | 4,121,911 |

French Pat. No. 2,361,461, as well as the copending application.

SUMMARY OF THE INVENTION

In accordance with the present invention, amine-based ethers are prepared by reacting (a) an amine with a (b) halogen-containing polyoxyalkylene polyol or a polyoxyalkylene glycol monoether derived from the reaction of a hydroxyl-containing compound having one to eight hydroxyl groups and a halogen-containing compound.

The halogenated polyoxyalkylene polyol may be prepared by the direct displacement of an available hydroxyl group with a halogen or a halogen-containing molecule.

Alternatively, the halogenated polyol may be prepared by reacting the hydroxyl group with an epihalohydrin to form a corresponding halohydrin ether. The halogenated polyoxyalkylene glycol monoether is, preferably, prepared by reacting the glycol with the epihalohydrin. Likewise, the monoether can be prepared by the direct displacement method denoted above.

Useful polyamines include, for example, polyalkylene polyamines, alkylene polyamines, cyclic amines, such as substituted and unsubstituted piperazines; as well as amino-substituted amines. Likewise, aryl amines, alkylaryl amines, and aralkylamines can be primary or secondary amines. Tertiary amines provide quaternary amines which can be used herein. Likewise, monoamines, such as alkylamines, arylamines, and the like, can be used herein. The monoamines can be of any degree of functionability, i.e., primary, secondary or tertiary.

The amines hereof are prepared, generally, by reacting the hydroxyl-containing compound and the halogen source in the presence of a suitable catalyst for about 0.5 to five hours at a temperature ranging from about 30° C. to about 100° C. Thereafter, the amine is reacted with the polyol or monoether at a temperature ranging from about 100° C. to about 150° C. for about one to five hours at a ratio of at least about two moles of amine per chlorine equivalent. Generally, substantial amounts of excess amine, i.e., generally about twice the stoichiometric requirement, is employed to encourage monosubstitution of the polyoxyalkylene moiety on the polyamine.

The products hereof generally correspond to the formula:

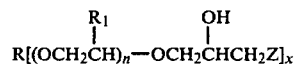

wherein:
R is the residue, after removal of one or more hydroxyl groups, of a hydroxyl-containing compound having one to eight hydroxyl groups;
$R_1$ is either H, $CH_3$ or $C_2H_5$;
Z is the residue, after removal of one or more amino hydrogens, of an amine selected from the group consisting of $NHR''_2$ in which $R''$ is hydrogen or a 1 to 8 carbon alkyl or hydroxyalkyl group, an alkylene diamine or a polyalkylene polyamine;
n is a number ranging from about 1 to about 100; and x is an integer ranging from 1 to 8.

The present polyamines are useful as intermediates in the preparation of cationic surfactants and polymers, as well as being fuel detergent additives and pulp paper drainage aids.

For a more complete understanding of the present invention, reference is made to the following detailed description and accompanying examples.

DESCRIPTION OF THE PREFERRED EMBODIMENT

In accordance with the present invention, there is provided monoamine, polyamine or polyamine ethers prepared by the formula:

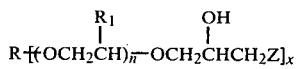

wherein:

R is the residue, after removal of one or more hydroxyl groups, of a hydroxyl-containing compound having one to eight hydroxyl groups;

$R_1$ is either H, $CH_3$ or $C_2H_5$;

Z is the residue, after removal of one or more amino hydrogens, of an amine selected from the group consisting of $-NHR''_2$ in which $R''$ is hydrogen or a $C_1$ to $C_8$ alkyl or hydroxyalkyl group, an alkylene diamine or a polyalkylene polyamine;

n is a number ranging from about 1 to about 100; and x is an integer ranging from 1 to 8.

The ethers hereof are prepared by reacting (a) a halogen-containing polyoxyalkylene polyol or a halogen-containing polyoxyalkylene glycol monoether with (b) an amine. More specifically, the present amines or amine ethers are prepared by reacting the above-denoted compound having from one to eight hydroxyl groups with a halogen-containing compound. The resulting halogenated ether is then reacted with an amine. The amine replaces the available halogen atom to form the compounds hereof.

The halogenated polyoxyalkylene polyol may be prepared by the direct displacement of an available hydroxyl group with either a halogen or a halogen-containing compound. Alternatively, the halogenated polyol may be prepared by reacting an available hydroxyl group with an epihalohydrin to form a corresponding halohydrin ether.

The halogenated polyoxyalkylene glycol monoether is preferably prepared by reacting the glycol with an epihalohydrin. Alternatively, the monoether can be prepared by the direct displacement technique noted above with respect to the polyoxyalkylene polyol.

Suitable polyols or glycol monoethers contemplated for use herein are polyoxyalkylated derivatives of hydroxyl compounds having from one to eight hydroxyl groups, including linear, branched, cyclic and aromatic hydroxy compounds. Representative hydroxyl compounds include, for example, alkanols such as methanol, ethanol, propanol, butanol, octanol, dodecanol, octadecanol and so forth, as well as mixtures thereof. Representative polyhydroxy compounds include, for example, ethylene glycol, propylene glycol, butylene glycol, glycerol, diglycerol, triglycerol, higher polyglycerols, di- and trimethylolpropane, di- and trimethylolbutane, sucrose, erythritol, pentaerythritol, sorbitol, mannitol, dextrose and so forth, as well as mixtures thereof. Also, substituted phenols having compatible substitutes may be used. Illustrative of such aromatic compounds are phenol, alkyl phenols, aralkyl phenols such as dodecyl phenol, cresols, nonyl phenol, diphenols such as resorcinol and the like, and aralkyl phenols such as bisphenol and the like.

In addition to the above enumerated hydroxyl compounds, it is to be understood that other polyhydroxyl compounds can be used herein. Such polyhydroxyl compounds, which are used to form oxyalkylated derivatives thereof, are, for example, aminohydroxy compounds, cyclic alcoholic compounds such as 1,4-dihydroxy cyclohexane; aromatic compounds such as dimethylolbenzene, phenol, alkylolated phenols, hydroquinone and the like, as well as mixtures thereof.

Suitable alkylene oxides for forming the oxyalkylated compounds used herein are, for example, ethylene oxide, propylene oxide, the butylene oxides, as well as mixtures thereof.

The oxyalkylated adducts are prepared by the reaction of the selected hydroxyl compound and the alkylene oxide under suitable oxyalkylation conditions well known to the skilled artisan.

In practicing the present invention, the preferred oxyalkylated hydroxyl-containing compound comprises a butylene oxide adduct of dodecyl phenol. As noted, the polyoxyalkylene hydroxyl-containing compound is halogenated by either (a) the direct halogenation thereof or (b) the reaction of the compound with an epihalohydrin to form a corresponding ether. Where direct halogenation is utilized, suitable halogens are either chlorine or bromine.

The epihalohydrins used herein correspond to the formula:

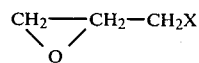

wherein X is halogen. In practicing the present invention, the preferred epihalohydrin is either epichlorohydrin or epibromohydrin.

When the polyoxyalkylene hydroxyl-containing compound is reacted with the epihalohydrin, a halohydrin ether is formed. Generally, the reaction is carried out at a temperature ranging from about 30° C. to about 100° C. and preferably, from about 50° C. to about 80° C. The reaction is usually carried out for a period ranging from about 0.5 to five hours, and preferably, one to three hours.

The reaction is carried out in the presence of a catalyst. Suitable catalysts include those enumerated in U.S. Pat. No. 3,496,120. Exemplifying such as catalysts are the Friedel-Crafts type, such as $AlCl_3$, $BF_3$, $ZnCl_2$, $FeCl_3$ etherates; acid catalysts such as HF, $H_2SO_4$, $H_3PO_4$ and the like. The preferred catalyst is borontrifluoride which is conventionally deployed in the form of an etherate. Generally, about 0.1 to five parts of catalysts per 100 parts by weight of polyol are used.

Generally, the amount of epihalohydrin and hydroxy compound employed will be substantially equivalent, particularly in the case of the mono- and difunctional hydroxy compounds. It is possible to employ less than equal amounts of epihalohydrins when the hydroxy compound is a higher functional compound such as pentaerythritol. Thus, on an equivalent basis, the amount of epihalohydrin to hydroxy compound employed will vary from 1:1 to 1:8.

The amine which is reacted with the halogenated hydroxyl-containing compound is, preferably, a polyamine of either primary, secondary or tertiary functionality. However, monoamines can be used.

Representative of the amines which can be used herein are, preferably, alkyl and alkylene amines which are, optimally, saturated compounds containing no double bonds. N-alkyl polyamines, N,N'-dialkyl polyamines and the like can be used herein, but are not preferred. Other types of amines which may be used herein are found in U.S. Pat. Nos. 2,644,670 and 3,152,188.

In practicing the present invention, the preferred amine reactants are primary amines. Hence, monoalkyl amines, primary alkylene polyamines, polyalkylene polyamines, cyclic amines and the like are useful herein.

Representative monoalkyl amines include methylamine, ethyl amine, substituted and unsubstituted propyl amines such as i-propylamine and n-propylamine. Representative substituted propylamines are those prepared by the reaction of a nitrile with ammonia followed by the hydrogenation thereof, such as the 3-aminopropylamines prepared by reacting acrylonitrile with ammonia followed by the hydrogenation thereof. Other useful monoalkyl amines are n-butylamine, i-butylamine, t-butylamine and so forth.

Representative alkylene polyamines include ethylene-diamine, propylenediamine, butylenediamine and so forth.

Suitable polyalkylene polyamines include triaminobutane, diethylenetriamine, dipropylenetriamine, triethylenetetramine and so forth. Suitable cyclic amines are represented by piperazine, aminoalkyl piperazines and the like. In practicing the present invention, the preferred amine is ethylenediamine.

In reacting the amine with the halogenated hydroxyl-containing compound, generally, in excess of three moles of amine per available halogen atom in the adduct is employed. Excesses of amine are employed to promote mono substitution of the polyoxyalkylene moiety on the polyamine to thus replace the halogen sites.

The reaction normally proceeds at a temperature ranging from about 100° C. to about 150° C. for a period ranging from about 0.5 hours to about 24 hours depending on the nature of the amine reactant. Preferably, the reaction is carried out at a temperature ranging from about 115° C. to about 150° C. for a period ranging from about one to ten hours.

The products produced hereby are useful as intermediates for the preparation of retention aids, dry and wet strength paper additives, flocculants for ore beneficiation, and waste treatment. In addition, the compounds hereof are useful as intermediates for the production of cationic and amphoteric surfactants; polyquaternary ammonium salts for ion exchange resins; water thickeners and drainage aids. Also, these compounds may be used as active-hydrogen compounds and as cross-linking agents used in the preparation of epoxy and urethane resins. Also, the present polyamines are useful as fuel detergent additives for preventing build up of carburetor deposits.

The present invention is distinct from the subject matter of the above-referred to copending application in that the value of m herein is zero. In other words, in the formula:

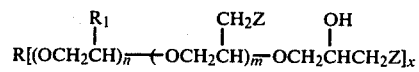

of the copending application, when m=O, the polyamines of the present invention are derived.

It should be noted, however, that in reactions between epihalohydrins and hydroxyl compounds, a certain amount of the halohydrin reacts with the hydroxyl group that is generated by ring opening on the halohydrin to form the halohydrin ether. Hence, a small proportion of the polyamines will contain some compound where m is a very low number. For purposes of the present invention, however, m is equal to or substantially equal to zero.

Generally, and in accordance herewith, the final amine ethers have an equivalent weight ranging from about 500 to 1800.

For a more complete understanding of the present invention, reference is made to the following examples illustrating the principles of the present invention. In the examples, which are to be construed as illustrative and not limitative of the invention, all parts are by weight absent contrary indications.

EXAMPLE 1

A. Adduct Preparation

Into a two-liter flask equipped with a stirrer, reflux condenser, addition funnel and a thermometer was added 1600 parts of a polyol comprising 20 mole butylene oxide adduct of dodecyl phenol having a hydroxyl number of 258. 3.2 Parts of boron trifluoride etherate, as a catalyst, was added to the flask.

The polyol and catalyst were heated in the flask to a temperature of about 62° C. to 67° C. 111 Parts (1.2 moles) of epichlorohydrin was then added to the flask, with stirring, over a 32 minute period while maintaining the temperature in the flask between 62° C. to 67° C. Since the reaction was exothermic, a cooling bath was deployed to maintain the denoted temperature range in the flask. After the addition was completed, agitation was maintained for one hour to ensure complete reaction. After the reaction was completed, six parts of sodium bicarbonate was added to the flask to kill the catalyst.

B. Polyamine Synthesis

To a one-liter reaction flask equipped with agitation means, reflux condenser, thermometer, addition funnel and heating means was charged 600 parts of ethylene diamine. The diamine was heated to reflux (117° C.) and the product of A was then added thereto over a one hour period. The temperature in the vessel was controlled by refluxing at a final temperature of 126° C.

After the reaction was completed, the mixture was allowed to stand for about 15 hours and was then transferred to a separatory funnel. A clear lower layer in the funnel of ethylene diamine and dissolved ethylene diamine hydrochloride was drawn off from the funnel.

The upper product layer was then washed successively with several portions of 30 percent sodium hydroxide solution.

After the washing was completed, the product was transferred to a distillation flask and excess ethylene diamine and water were vacuum stripped off up to a temperature of 148° C. at three mls. of pressure. The product was then filtered.

1585 Parts of a clear amber product were recovered. The product had a total nitrogen content of 1.75 percent, tertiary nitrogen content of 0.12 percent, and a hydroxyl number of 43.9.

No chlorine was detected thus indicating that all of the chlorine atoms originally present in the polyol reactant have been replaced with amino groups.

EXAMPLE 2

A. Adduct Preparation

Into a two-liter flask was added 1231 parts (0.6 mole) of a polyoxypropylene glycol of about 2050 mole weight and 2.5 parts of boron trifluoride etherate as a catalyst. With suitable heating means, the mixture was heated to about 55° C. Thereafter, 12 parts of epichlorohydrin was added to the flask over a 70 minute period. The temperature within the reaction vessel was maintained between 55° C. and 65° C. with a water cooling bath.

The reaction mixture was stirred for two hours while maintaining the temperature within the range of 55° C. to 65° C.

Thereafter, five parts of sodium bicarbonate was added to the reaction vessel to destroy the catalyst. The product was stripped under reduced pressure at a temperature of 75° C. and under a vacuum of less than five millimeters of mercury (Hg). An insignificant amount of volatiles were stripped off, indicating complete reaction of the epichlorohydrin.

B. Polyamine Synthesis

Into a three-liter, four-neck flask equipped with agitation means, thermometer, addition funnel and reflux condenser was added 600 parts of ethylene diamine. The vessel was then heated to the reflux temperature of 118° C. The adduct of step A hereof was then added to the vessel through the addition funnel over a one hour period while maintaining the reflux temperature. During the addition period, the temperature within the vessel rose to 131° C. After the addition was completed, the reaction mixture was stirred for one hour at reflux temperature. Thereafter, the reaction mixture was allowed to stand for about 16 hours.

Thereafter, the amine hydrochloride formed in the flask was neutralized by the addition of three hundred parts of 17.7 percent sodium hydroxide. Then, excess ethylene diamine and water were removed from the flask by distillation at a temperature of about 130° C. at atmospheric pressure. After the distillation was completed, residual water and amine were removed by vacuum stripping at a temperature of 110° C. to 120° C. at a vacuum of less than 5 millimeters of Hg.

After the vacuum stripping was completed, a crude product was recovered. The crude product comprised a mixture of amine-terminated polyether and sodium chloride. The sodium chloride was separated from the crude product by filtration. 1553 Parts of a final product, having a light amber color, was recovered. The liquid product was found, upon analysis, to contain 2.75 percent of amino hydrogen.

EXAMPLE 3

A. Adduct Preparation

Into a reaction vessel equipped with agitation means, water cooling bath, thermometer and heating means was added 1177 parts (0.3 mole) of a polyoxypropylene glycol having a molecular weight of about 3900. In addition, 2.5 parts of boron trifluoride etherate, as a catalyst, was added to the hydroxyl-containing compound. The flask was heated to a temperature of 53° C. With stirring, 61 parts of epichlorohydrin was added to the flask over a 25 minute period. During the addition period, the temperature in the flask rose to 60° C. As the temperature within the reaction vessel continued to rise, the water cooling bath was applied to maintain the temperature within a range of about 60° C. to about 70° C. After the addition was completed, the reaction mixture was stirred for about 75 minutes. Thereafter, five parts of sodium carbonate was added to the vessel to destroy the catalyst. The product was stripped under reduced pressure at a temperature of about 70° C. and under a vacuum of less than five millimeters of Hg.

B. Amine Synthesis

Into a three-liter flask, equipped as described in Example 2, was added 396 parts of ethylene diamine. The ethylene diamine was heated to reflux temperature and maintained thereat. Then, the adduct of step A above was added to the flask over a period of over one hour. The reflux temperature rose in the flask to 132° C. After the addition was completed, the reaction vessel was maintained at 132° C. for an additional hour to insure complete reaction.

After the reaction was completed, the amine hydrochloride was neutralized by treatment with 106 parts of 25 percent sodium hydroxide solution. The final product was recovered in the manner described in Example 2. 1149 Parts of a clear, viscous amber product was recovered. Analysis indicated that the product contained 1.42 percent of amino nitrogen.

EXAMPLE 4

A. Adduct Preparation

Into a reaction vessel, equipped as described in Example 2, was added a fatty alcohol ether having a molecular weight of 1212. The fatty alcohol ether comprised the reaction product of 1,2-epoxybutane and a straight chain $C_{12}$ to $C_{15}$ alcohol. 1212 Parts of the ether was added to the flask along with 2.4 parts of boron trifluoride etherate. The mixture was heated to about 60° C. and 111 parts of epichlorohydrin was added thereto over a 35 minute period. The temperature in the flask was maintained between 60° C. and 65° C. during the addition. After the addition was completed, the reaction mixture was stirred for an additional two hours at 60° C. Thereafter, 4.8 parts sodium bicarbonate was added to the flask to destroy the catalyst. Then, the flask was vacuum stripped to recover the adduct.

After the adduct was prepared, a polyamine in accordance with the present invention was prepared therefrom.

B. Polyamine Synthesis

Into a three-liter flask, equipped as described in Example 2, was added 300 parts of ethylene diamine. The diamine was heated to reflux temperature. While maintaining the reflux temperature in the flask, the adduct was added thereto over a one hour period. During the addition period, the temperature in the vessel rose to 140° C. After the addition was completed, the mixture was maintained under agitation and at the reflux temperature of 140° C. for an additional hour. Thereafter, the vessel was cooled to 60° C. When the temperature in the vessel reached 60° C., 196 parts of 25 percent sodium hydroxide solution was added to the flask to neutralize the amine hydrochloride. After neutralization, excess ethylene diamine and water were removed by distillation at atmospheric pressure up to a temperature of 130° C. and then under a reduced pressure to a temperature of 125° C. at 3 millimeters of Hg pressure.

Sodium chloride was separated by filtration from the crude product. 1243 Parts of a pale yellow, clear liquid was recovered. Upon analysis, the product evidenced an amino nitrogen content of 2.43 percent.

EXAMPLE 5

A. Adduct Preparation

Into a two-liter flask, equipped as described in Example 2, was added 1035 parts (1 mole) of a butoxylated n-butanol and 2.1 parts of boron trifluoride etherate. The mixture was heated to 60° C. and maintained thereat. Over a 35 minute period, 111 parts of epichlorohydrin was added to the flask. During the addition period, the temperature in the flask was maintained between 60° C. and 70° C. After the addition was completed, the reaction mixture was stirred for an additional two hours at about 65° C. to insure complete reaction. After the reaction was completed, 4.2 parts of sodium bicarbonate was added to the flask to destroy the catalyst. The adduct was recoverd after first stripping the vessel at a reduced pressure of 4 millimeters of Hg at elevated temperatures. The adduct thereof was then utilized to prepare a polyamine.

B. Polyamine Synthesis

Using a three-liter flask, as described in Example 2, was added 300 parts of ethylene diamine. The ethylene diamine was heated to reflux temperature and maintained thereat. Then, over a 100 minute period, during which the reflux temperature rose from 118° C. to about 130° C., the adduct of step A was added to the flask. After the addition was completed, agitation was maintained for an additional one hour at the reflux temperature. Next, the vessel was cooled to 60° C. and 196 parts of 25 percent sodium hydroxide solution was added to the flask to neutralize the catalyst. After neutralization was completed, excess ethylene diamine and water were removed by first distilling up to a temperature of 135° C. at atmospheric pressure, and thereafter, by stripping the vessel up to a temperature of 120° C. at 3 millimeters of Hg. 1558 Parts of crude product were recovered. Sodium chloride was then removed from the crude product by filtration. 1226 Parts of light yellow, viscous product was recovered. Analysis indicated that the polyamine contained 2.03 percent amino nitrogen.

Having thus described the invention, what is claimed is:

1. A polyamine corresponding to the formula:

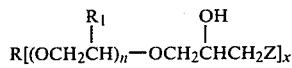

wherein:
R is the residue of a hydroxyl compound having 1 to 8 hydroxyl groups;
$R_1$ is H, $CH_3$ or $C_2H_5$;
Z is the residue, after removal of one or more amino hydrogens, of an amine selected from the group consisting of $NHR''_2$ in which $R''$ is hydrogen or $C_1$ to $C_8$ alkyl group, an alkylene diamine or a polyalkylene polyamine;
n is a number ranging from 1 to 100; and
x is an integer ranging from 1 to 8.

2. The polyamine of claim 1 wherein R is the residue of dodecyl phenol and $R_1$ is $C_2H_5$.

3. The polyamine of claim 1 wherein Z is the residue of ethylene diamine.

4. The polyamine of claim 1 wherein R is the residue of dodecyl phenol, $R_2$ is $C_2H_5$ and Z is the residue of ethylene diamine.

5. The polyamine of claim 1, wherein the polyamine comprises the reaction product of an ether with an amine, wherein said ether is prepared by first reacting a hydroxyl-containing compound containing from 1 to 8 hydroxyl groups with an alkylene oxide to form a polyoxyalkylated compound, and thereafter reacting the polyoxyalkylated compound with a halogen-containing compound.

6. The polyamine of claim 5 wherein the ether comprises the reaction product of a polyoxyalkylated derivative of a hydroxyl compound having from 1 to 8 hydroxyl groups and an epihalohydrin.

7. The polyamine of claim 5 wherein the ether is oxyalkylated with either ethylene oxide, propylene oxide, a butylene oxide or mixtures thereof.

8. The polyamine of claim 5 wherein the ether is halogenated either with halogen or an epihalohydrin.

9. The polyamine of claim 5 wherein the amine is a primary amine selected from the group consisting of monoalkylamines, alkylenepolyamines, polyalkylenepolyamines and cyclic amines.

10. The polyamine of claim 9 wherein the amine is ethylene diamine.

11. The polyamine of claim 5 wherein the reaction is carried out at a temperature ranging from about 100° C. to about 150° C. for about 0.5 to about 24 hours.

12. The polyamine of claim 5 wherein the amine is present in an amount of at least three moles thereof per available halogen atom in the ether.

13. The polyamine of claim 5 wherein (a) the ether comprises the reaction product of epichlorohydrin and a 20 mole butylene oxide adduct of dodecyl phenol, and (b) the amine is ethylene diamine.

14. The polyamine of claim 1 wherein the polyamine has an equivalent weight ranging from about 500 to about 1800.

15. A motor fuel composition comprising a major proportion of hydrocarbons boiling in the range of gasoline and from 30 parts per million to 2000 parts per million of a polyamine of claim 1.

* * * * *

UNITED STATES PATENT AND TRADEMARK OFFICE
CERTIFICATE OF CORRECTION

PATENT NO. : 4,261,704

DATED : April 14, 1981

INVENTOR(S) : William K. Langdon

It is certified that error appears in the above-identified patent and that said Letters Patent are hereby corrected as shown below:

Column 10, line 22, Claim 4, "$R_2$" should read --$R_1$--.

Signed and Sealed this

Seventh Day of July 1981

[SEAL]

Attest:

RENE D. TEGTMEYER

Attesting Officer     Acting Commissioner of Patents and Trademarks